United States Patent [19]
Kivioja et al.

[11] Patent Number: 5,909,917
[45] Date of Patent: *Jun. 8, 1999

[54] METHOD FOR PROVIDING A ROLL MANTLE OF A TUBULAR ROLL FOR A PAPER MACHINE OR EQUIVALENT WITH GLIDE BEARINGS

[75] Inventors: Pekka Kivioja; Esa Salavamäki, both of Muurame, Finland

[73] Assignee: Valmet Corporation, Helsinki, Finland

[*] Notice: This patent is subject to a terminal disclaimer.

[21] Appl. No.: 08/892,424

[22] Filed: Jul. 14, 1997

Related U.S. Application Data

[62] Division of application No. 08/411,439, Mar. 27, 1995, Pat. No. 5,685,813.

[30] Foreign Application Priority Data

Feb. 22, 1995 [FI] Finland .................................. 950814

[51] Int. Cl.$^6$ .................................................. B23P 15/00
[52] U.S. Cl. ................................ 29/895.2; 29/895; 492/7
[58] Field of Search ............................. 29/895.2; 2192/7, 2192/10, 20

[56] References Cited

U.S. PATENT DOCUMENTS

| | | | |
|---|---|---|---|
| 4,625,637 | 12/1986 | Pav et al. | 100/47 |
| 4,651,547 | 3/1987 | Morel et al. | 72/8 |
| 4,793,250 | 12/1988 | Niskanen | 100/35 |
| 5,060,357 | 10/1991 | Roerig et al. | 29/113.2 |
| 5,063,649 | 11/1991 | Wenzel et al. | 29/116.1 |
| 5,111,563 | 5/1992 | Brown et al. | 29/116.2 |
| 5,509,883 | 4/1996 | Niskanen et al. | 492/20 |

FOREIGN PATENT DOCUMENTS

| | | |
|---|---|---|
| 0332594 | 8/1989 | European Pat. Off. . |
| 76870 | 11/1985 | Finland . |
| 74070 | 8/1987 | Finland . |
| 925761 | 12/1992 | Finland . |
| 3941965 | 5/1990 | Germany . |
| 810204852 | 6/1983 | Japan . |
| 472590 | 5/1969 | Switzerland . |
| 2036252 | 6/1980 | United Kingdom . |
| 2049516 | 12/1980 | United Kingdom . |
| 8803611 | 5/1988 | WIPO . |

*Primary Examiner*—Irene Cuda
*Attorney, Agent, or Firm*—Steinberg & Raskin, P.C.

[57] ABSTRACT

A method for fitting a roll mantle of a tubular roll used in a paper machine or equivalent with glide bearings and a tubular roll. The roll mantle is supported on a stationary roll axle by hydraulic glide bearing elements acting upon the roll mantle and/or upon the roll ends. The bearing elements are loaded hydraulically by the pressure of a first pressure medium. The roll is loaded from outside radially in the direction of at least one plane, i.e. in a so-called principal loading direction. The roll mantle is supported on the roll axle by the glide bearing elements which act radially substantially in the principal loading direction in opposite directions and which are provided with a device for regulating the braking pressure provided by a second pressure medium, so that in the principal loading direction, the roll mantle is allowed to move over a certain distance. When the roll mantle approaches its preset extreme position in that direction, the movement of the roll mantle is braked and slowed down by the regulation device, and finally the movement is stopped in its extreme position by the glide bearing elements.

5 Claims, 6 Drawing Sheets

METHOD FOR PROVIDING A ROLL MANTLE OF A TUBULAR ROLL FOR A PAPER MACHINE OR EQUIVALENT WITH GLIDE BEARINGS

This application is a divisional of U.S. patent application Ser. No. 08/411,439 filed Mar. 27, 1995, now U.S. Pat. No. 5,685,813.

BACKGROUND OF THE INVENTION

The present invention relates to a method for fitting a tubular roll mantle of a roll intended for a paper machine or equivalent with glide bearings, in which the roll mantle is supported on a stationary roll axle by means of hydraulic glide bearing elements acting upon the roll mantle or upon the roll ends. The bearing elements are hydraulically loaded by the effective pressure applied by a pressure medium. The roll is loaded from its exterior radially in the direction of at least one plane, i.e. in a so-called principal loading direction.

The invention also relates to a tubular roll that makes use of the method in accordance with the invention for a paper machine or equivalent. The roll mantle of the roll is revolvingly supported on a stationary roll axle by means of glide bearing elements that act upon the inner face of the roll mantle and/or upon the roll ends. The glide bearing elements are loaded by means of the pressure of a hydraulic pressure medium, while the roll is loaded from its exterior radially in the direction of at least one plane, i.e., in the so-called principal loading direction.

Tubular rolls in paper machines are ordinarily mounted or journalled on the roll axle at the ends of the roll mantle by means of roller bearings. Such a conventional mode of journalling has its advantages, for example, the fact that the journalling can be accomplished quite simply, and so far its costs have been considered to be relatively moderate. However, this conventional mode of journalling, in which the roll mantle is journalled on the axle permanently by its ends, is not suitable for all objects of use in paper machines. In quite a number of cases, the roll mantle must be able to move radially in relation to the roll axle, which characteristic is quite often required, e.g., for variable-crown rolls which are in nip contact with a back-up roll. By means of the crown variation means in a variable-crown roll, attempts are made to shape the roll mantle in the desired way especially in view of regulation of the profile of linear load. Therefore, the roll ends must also be able to move in the radial direction in relation to the axle in order that the profile of linear load could be controlled in the end areas of the roll. In addition to the profile-regulation properties in the end areas of the roll, the regulation of the loading in the end areas of the roll also affects the control of the temperatures in the end areas of the roll.

For this reason, such rolls have been developed in which the entire roll mantle can move in the direction of loading radially in relation to the roll axle. One roll of this type is described in the assignee's EP Patent No. 0 332 594. In the roll described in this reference, the end bearings of the variable-crown roll are not mounted directly on the central axle of the roll. Rather, the bearings are arranged on separate annular parts which can move radially in relation to the roll axle. The variable-crown roll in accordance with this reference is a nip roll, and the radial movement of the roll mantle is confined to the direction of the nip plane. The movement is accomplished so that hydraulic power units are arranged between the annular parts and the roll axle. The power units shift the end bearings by means of a hydraulic pressure medium toward the nip or away from the nip. The principal object of the device in EP '594 is to open and close the nip. There is also a large number of other rolls of similar type, which produce a substantially corresponding action accomplished by means of a somewhat different technique.

The fitting of a roll with roller bearings also produces considerable drawbacks and/or problems for the manufacture and operation of the roll. It is one particular drawback that the roller bearings require certain machining of the roll mantle. The wear of the bearings may also result in problems and, further, the roller bearings impose their restrictions in respect of the oil or fluid to be used in the roll. For example, the following properties can be considered as the weak points of the conventional mode of journalling.

Restrictions of speed: Even at present, the speeds of rotation of the rolls exceed the maximum permitted speeds specified by bearing manufacturers.

Precision of rolling: With the present technology, it is very difficult to increase the rolling precision of an assembled roll further. In a traditional roll, even if all the components (bearings, bearing spaces, outer face of mantle) are machined as precisely as possible, the defects are summed up in an assembled roll.

Fitting of a roll mantle with glide bearings is also known in the prior art. Such rolls with glide bearings are described, e.g., in U.S. Pat. Nos. 5,060,357 and 5,111,563. In the roll in accordance with the '357 patent, the roll mantle is provided with roller bearings arranged in the areas of its end pieces. The bearings are arranged on separate ring parts of a type similar to those described in EP '594. The roll is intended for use as a nip roll, and its roll mantle can move in the direction of the nip plane in relation to the axle, e.g., for the purpose of opening and closing the nip. Lateral support of the roll mantle, i.e. the support in the direction transverse to the nip plane, is provided by means of a complicated construction of glide bearings which endeavors to make the movement of the roll mantle take place exactly in the direction of the nip plane. It is a drawback of the construction that it is extremely complicated, for example, with a number of glide faces and arrangements of articulated joints, for which reason, the reliability in operation, controllability, and the dependability of the construction cannot be considered to be very good. It is a further problem of the apparatus in accordance with the '357 patent that forces transverse to the nip plane and applied to the roll from outside, i.e., the roll exterior, cannot be compensated for because such forces cause a disruption of the oil film between the glide shoes and the inner face of the roll mantle. In U.S. Pat. No. 5,111,563, an arrangement of lateral support of a roll with glide bearings is described, which arrangement is simpler than the apparatus of the '357 patent mentioned above. In this reference, the arrangement of the glide bearings in the lateral direction is accomplished by means of an arrangement of articulated joints that is likewise not capable of compensating for lateral forces applied to the roll from outside.

OBJECTS AND SUMMARY OF THE INVENTION

Accordingly, it is an object of the present invention to provide new and improved method for fitting the roll mantle of a roll for use in a paper machine or equivalent with glide beatings and a tubular roll of a novel type and fitted with glide bearings for a paper machine or equivalent.

It is another object of the present invention to provide a new and improved roll by means of which the drawbacks related to the prior art are substantially avoided and by means of which roll, at the same time, a substantial improvement is achieved over existing constructions and over the controllability of existing rolls.

It is another object of the present invention to provide a new and improved device and method for neutralizing or counteracting external forces applied to a roll mantle.

In view of achieving these objects, and others, in the method in accordance with the invention, the roll mantle is supported on a roll axle by means of glide bearing elements which act radially substantially in the principal loading direction in opposite directions and which are provided with means for regulation of the braking pressure such that, in the principal loading direction, the roll mantle is allowed to move over a certain distance. When the roll mantle approaches a preset extreme position in the principal loading direction, the movement of the roll mantle is braked or slowed down by means of the device for regulation of the braking-pressure medium flowing into the glide-bearing element, and finally the movement is stopped in its extreme position by means of the glide bearing elements.

In the tubular roll in accordance with the invention, the roll mantle is supported on the roll axle by means of glide bearing element, which are loaded radially substantially in the principal loading direction in opposite directions and each of which is connected with a braking-pressure regulation device of its own. A certain maximal shifting movement is permitted for the roll mantle whereby when the roll mantle approaches its extreme position, the braking-pressure regulation device is arranged to feed a braking-pressure medium into the glide bearing elements so as to brake or slow down the movement of the roll mantle and finally to stop the movement of the roll mantle in its extreme position.

By means of the present invention, a number of remarkable advantages are obtained, compared with the prior art devices. Of these advantages, the following should be stated. The mode of journalling by means of glide bearings in accordance with the invention permits controlled movements of the roll mantle without outside control. The journalling of the roll is accomplished by means of hydraulic glide bearing elements so that, owing to the mode of regulation, the consumptions of oil and power are very low. Further, the mode of journalling by means of glide bearings in accordance with the invention protects the oil films of the glide bearing elements in the areas of extreme positions of the roll mantle. The mode of obtaining the desired goals of the method and apparatus in accordance with the invention is quite simple and thus reliable in operation.

Further advantages and characteristic features of the invention come out from the following detailed description of the invention.

BRIEF DESCRIPTION OF THE DRAWINGS

In the following, the invention will be described in detail with reference to the figures in the accompanying drawings and to preferred exemplifying embodiments of the invention illustrated therein.

DETAILED DESCRIPTION OF THE INVENTION

Figure 1:
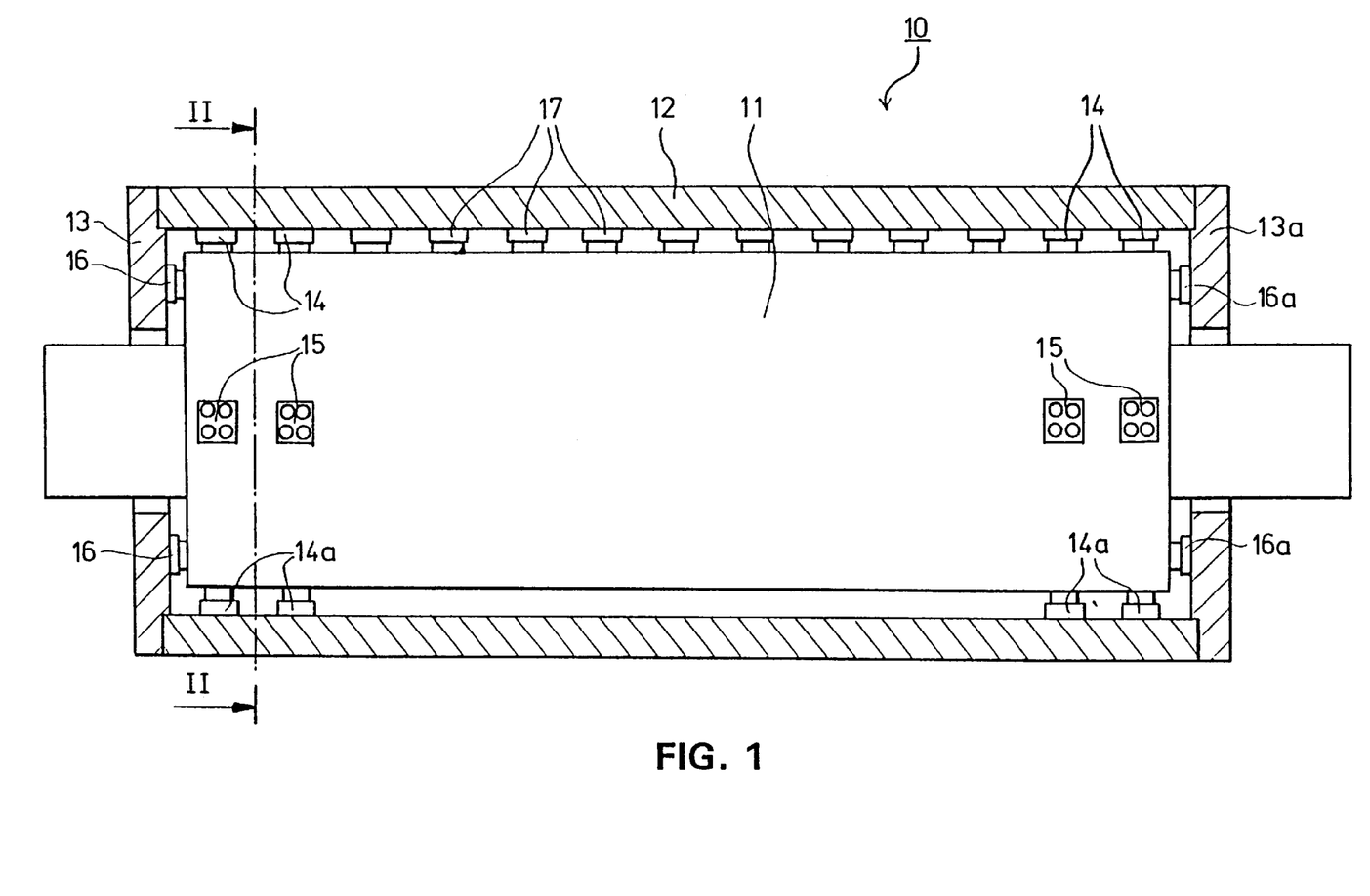
FIG. 1 is a sectional side view of a roll fitted with glide bearings in accordance with the invention and which is a variable-crown roll in the exemplifying embodiment shown herein.
Figure 2:
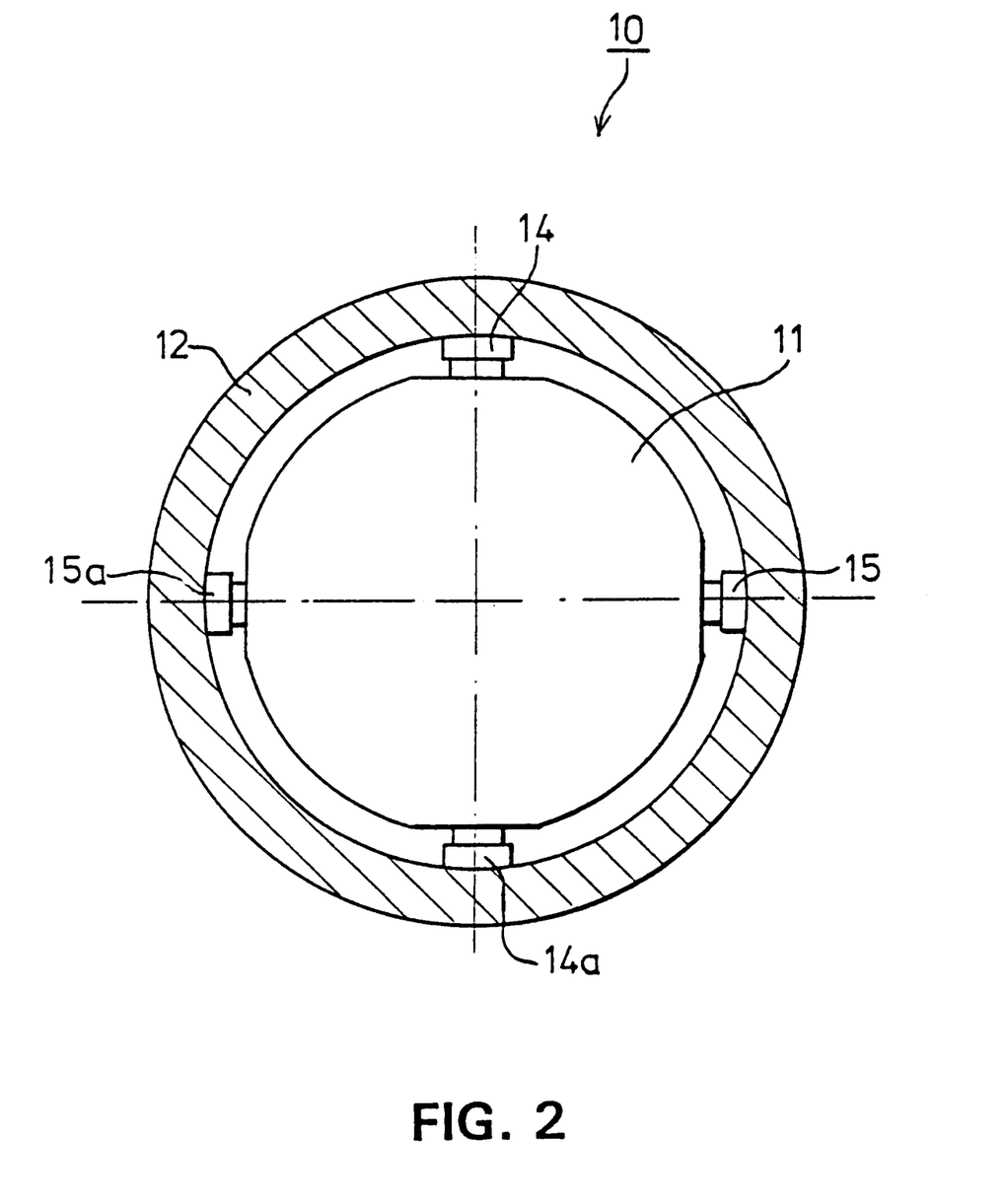
FIG. 2 is a sectional view taken along the line II—II in FIG. 1.

Referring to the accompanying drawings wherein the same reference numerals refer to the same elements, FIGS. 1 and 2 are sectional views of a tubular roll fitted with glide bearings in accordance with the invention so that FIG. 1 is an axial sectional view in the vertical plane of the roll, and FIG. 2 is a sectional view of the roll as shown in FIG. 1, taken along the line II—II. In FIGS. 1 and 2, the roll is denoted generally by reference numeral 10, and in these illustrated embodiments the roll 10 is a variable-crown roll, which comprises a stationary roll axle 11, on which the roll mantle 12 is fitted to revolve. The roll mantle is supported on the roll axle by means of hydraulic loading members 17 extending along substantially the entire axial length of the roll. The hydraulic loading members 17 are effective in the direction of the nip plane, and by their means, it is possible to adjust the shape of the roll mantle 12 and control the nip profile of the roll in the axial direction of the roll as desired.

The roll 10 as shown in FIGS. 1 and 2 is a roll provided exclusively with glide bearings, so that the roll 10 does not have any conventional roller bearings fitted at the roll ends. The journalling of the roll 10 has been accomplished by means of glide bearing elements, of which elements the glide bearing elements that are effective in the direction of loading, i.e., in the direction of the nip plane in the case of the roll as shown in FIGS. 1 and 2, are denoted by reference numerals 14 and 14a. The first glide bearing elements 14 are effective in the direction of the nip formed at the top of the roll 10, i.e., against the loading in the so-called main loading direction, and the second glide bearing elements 14a are effective in the opposite direction. In the exemplifying embodiment shown in FIGS. 1 and 2, it is shown further that the roll 10 is also provided with glide bearing elements 15,15a effective in the direction transverse to the loading direction. There are at least one pair of glide bearing elements 14,14a,15,15a arranged in connection with the roll. Elements 15,15a are effective in opposite directions. Of course, conventional roller bearings can be used if desired.

Since the roll 10, as illustrated, is fitted exclusively with glide bearings, it may also be provided with at least one pair of glide bearing elements 16,16a effective in the axial direction of the roll in opposite directions. Elements 16,16a are supported by the intermediate of a fluid film against the roll ends 13,13a, respectively. As shown in FIGS. 1 and 2, the glide bearing elements 14,15,14a,15a effective in the radial direction are supported against the inner face of the roll mantle 12 by the intermediate of a fluid film. In the illustrated embodiment shown in FIG. 1, the glide bearing elements 14,14a,15,15a effective in the radial direction are arranged in pairs so that there are two pieces of each glide bearing element which are placed side by side in the axial direction. However, in view of the operation, such an arrangement is not an indispensable requirement since the journalling of the roll can also be accomplished by other means, for example, by means of single glide bearing elements alone or more than two such glide bearing elements.

In the illustrated embodiments shown in FIG. 2, the glide bearing elements 14,14a,15,15a are arranged to act in the direction of loading of the nip and in the direction transverse to the nip-loading direction. However, there may also be a greater number of glide bearing elements, which are fitted to act radially in different angular positions. Regarding the axial glide-bearing elements, it can be stated further that, differing from FIG. 1, the axial movements of the roll mantle 12 can be controlled by means of just single glide bearing elements 16,16a alone, which are effective in the same plane in opposite directions. There may also be a greater number of such axial glide bearing elements 16,16a, which are, for example, uniformly spaced to act upon the inner faces of the roll ends 13,13a.

Figure 2A:
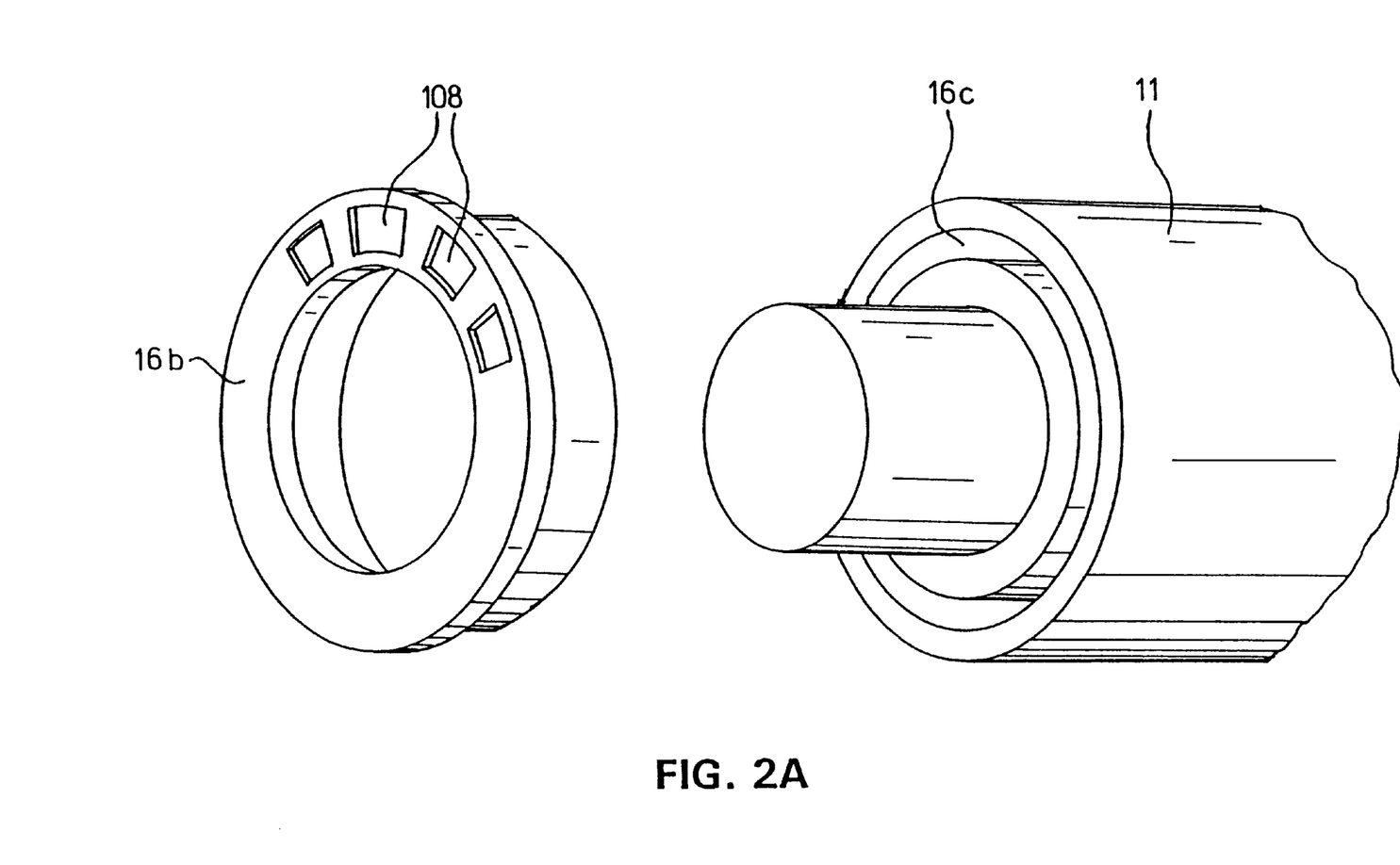
FIG. 2A is a perspective view of an exemplifying embodiment of a preferred construction of the axial support of the roll.

In FIG. 2A, a preferred embodiment of the axial glide bearing elements is shown. In this embodiment, axial glide bearing elements 16b are annular glide bearings having a support face which is supported against the roll end 13,13a. Fluid pockets 108 are formed in the support face. Similarly, an annular groove 16c is formed into the roll axle 11, in which the "piston part" of the glide bearing element 16b is fitted. The axial support can also be arranged so that glide-bearing elements 16b are supported against the same roll axle end 13 from opposite sides, in which case axial glide bearings are not needed at the opposite end of the roll.

Figure 3:
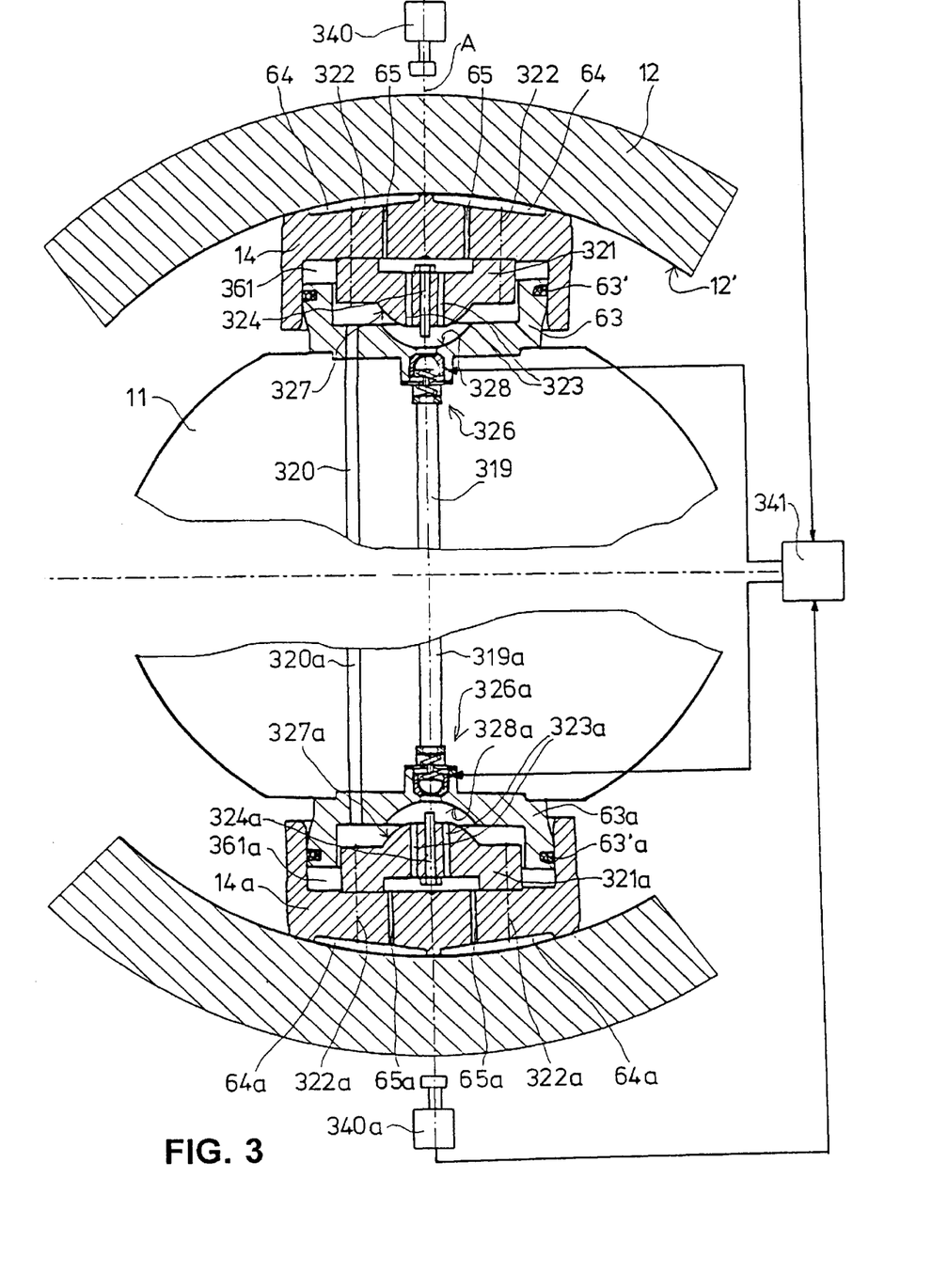
FIG. 3 is a more detailed partial sectional view of the support of the roll mantle and of the control of its movements in the so-called principal loading direction.

FIG. 3 is a schematic and partial sectional view of the support of the roll mantle in the so-called principal loading direction, i.e., in the case of a variable-crown roll 10 as shown in FIG. 1, in the direction of the nip plane. In FIG. 3, the nip plane is denoted by reference A. Also in this figure, the roll axle is denoted by reference numeral 11, and the roll mantle is denoted by reference numeral 12. In the following, the construction of the support arrangement as shown in FIG. 3 will be described, followed by a description of the operation of the support arrangement.

The roll mantle 12 is supported by means of glide bearing elements 14,14a which are loaded against the inner face 12' of the roll mantle. Elements 14,14a act, as shown in FIG. 3, in opposite directions so that the first glide bearing element 14 is arranged to load the roll mantle 12 toward an outside load applied to the roll mantle, i.e., in the arrangement shown in FIG. 1 toward the nip, and the second glide bearing element 14a is arranged to load the roll mantle in the opposite direction. In the construction shown in FIG. 3, the glide bearing elements 14,14a are, thus, arranged in the nip plane A to act in opposite directions. The glide bearing elements 14,14a are provided with respective cavity spaces 361,361a that are pressurizable, and for each glide bearing element 14,14a, a respective frame piece 63,63a is mounted on the roll axle 11. The frame pieces penetrate into a respective one of the cavity spaces 361,361a in the glide bearing elements. The frame pieces 63,63a are sealed in relation to the cavity spaces by means of seals 63',63'a so that the glide bearing elements 14,14a can move in relation to the frame pieces 63,63a without leakage of the pressure medium in the cavity spaces. Seals 63',63'a are situated on an outer face the frame pieces 63,63a and engage with an inner face of the glide bearing elements 14,14a which defines the cavity spaces 361,361a.

As to the construction of the glide bearing elements 14,14a, the elements are conventional and include in their outer faces oil pockets 64,64a which communicate with the cavity spaces 361,361a through capillary bores 65,65a that pass through the glide bearing elements. To the bottom faces of the glide bearing elements 14,14a which define the cavity spaces 361,361a, bottom pieces 321,321a have been fixed by fastening means 322,322a, for example screw members. Bores 323,323a are formed in and extend through the bottom pieces 321,321a in order to connect the cavity spaces 361, 361a with the capillary bores 65,65a and, through the capillary bores, to the oil pockets 64,64a. Thus, from the pressurized cavity spaces 361,361a, through the bores 323, 323a and the capillary bores 65,65a, a pressure medium has access into the oil pockets 64,64a to form a fluid film between the glide bearing elements 14,14a and the inner face 12' of the roll mantle.

The pressure medium that is used for loading the glide bearing elements 14,14a is introduced into the glide bearing elements through respective pressure ducts 320,320a. The feed of the setting pressure is arranged through the pressure ducts 320,320a, and, by means of this setting pressure, loads of the desired magnitude are applied to the glide bearing elements 14,14a.

Into each glide bearing element 14,14a, a second duct also passes, i.e. the braking-pressure feed duct 319,319a. Through the braking-pressure feed duct 319,319a, the braking-pressure medium is selectively passed to the glide bearing elements 14,14a, and by means of this pressure medium, the movement of the glide bearing element 14,14a concerned and, thus, of the roll mantle 12 is braked and slowed down when the roll mantle 12 approaches its extreme position, and finally the roll mantle 12 is stopped in its permitted extreme position by means of the braking-pressure medium.

The braking-pressure feed duct 319,319a does not open directly into the cavity space 361,361a in the glide bearing element 14,14a, but rather access of the braking pressure into the cavity space 361,361a is regulated by means of a regulation device 326,326a fitted in or connected to the frame piece 63,63a of the glide bearing element. Through the regulation device 326,326a, the braking pressure can act in the desired manner between the concave spherical face 328 formed into the frame piece 63,63a and the convex spherical face 327,327a provided on the bottom piece 321, 321a of the glide bearing element 14,14a. It is shown further in FIG. 3 that a pin 324,324a is provided on the respective frame piece 321,321a and projects therefrom. Each pin 324,324a acts upon a respective one of the regulation devices 326,326a to open a flow passage through which the braking-pressure medium flows from a reservoir thereof into the cavity spaces 361,361 and then into the oil pockets 64,64a when the roll mantle 12 is close to and approaching its extreme position.

The load-setting pressure proper of the glide bearing elements 14,14a achieved by the flow of setting pressure medium via pressure ducts 319,319 may be switched off when the roll mantle reaches its preset extreme position.

Figure 3A:
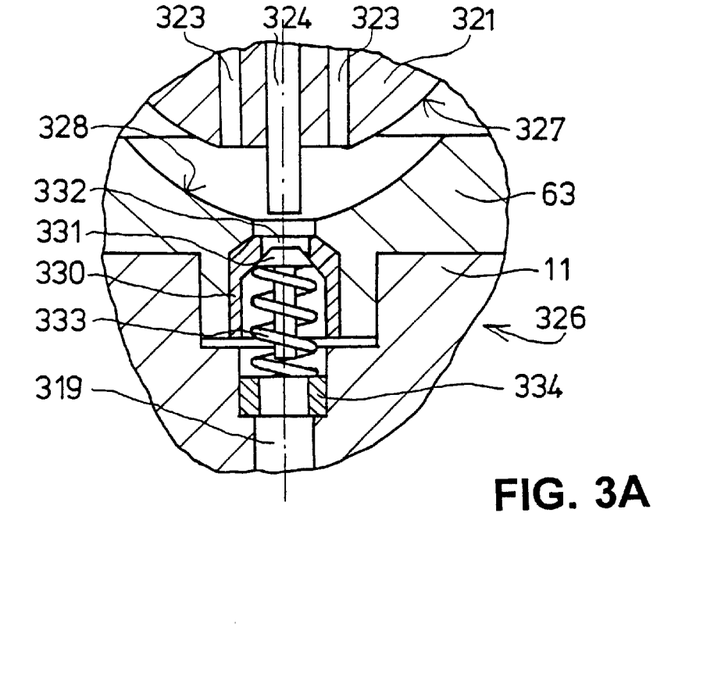
FIG. 3A is a more detailed illustration of the regulation device used for the support and of its mechanical positive control.

The construction of the regulation device 326,326a and so also the mechanical positive control of the operation of the support arrangement are described in more detail in relation to FIG. 3A, which is a more detailed illustration of the regulation device.

As shown in FIG. 3A, the regulation device 326 includes a simple back valve which comprises a valve body 330 having an interior space, a closing piece 331 arranged in the interior space of the valve body 330, a spring 333 engaging with and loading the closing piece 331 and which, in the illustrated embodiment shown in FIG. 3A, covers and closes a valve opening 332. In the embodiment shown in FIG. 3A, a support piece 334 is mounted on the orifice of the feed duct 319 of the braking pressure, against which piece 334 the spring 333 rests. In the other respects, the reference numerals of elements in FIG. 3A correspond to those described in FIG. 3 so that reference numeral 11 denotes the roll axle, reference numeral 63 denotes the frame piece of the glide bearing element, and reference numeral 328 denotes the concave spherical face formed into the frame piece 63. Similarly, reference numeral 321 denotes the bottom piece of the glide bearing element, reference numeral 327 denotes the convex spherical face formed on the bottom piece, reference numerals 323 denote the bores passing through the bottom piece 321, and reference numeral 324 denotes the pin installed in the bottom piece. As described previously in relation to FIG. 3, the setting pressure proper is fed into the glide bearing element through the pressure duct 320, which is not shown in FIG. 3A. In the braking-pressure feed duct 319, there is constantly a braking pressure of a certain magnitude, also in the situation shown in FIG. 3A, in which the regulation device 326, i.e. the back valve, is closed.

When the roll mantle 12 approaches its extreme position in the direction of loading of the glide bearing element, i.e., in the case of FIG. 3A, when the roll mantle 12 moves down, the glide bearing element 14 proper and the frame piece 63 approach one another, whereby the space between the spherical faces 327,328 shown in FIG. 3A becomes smaller. When the movement approaches its extreme position, the pin 324 penetrates through the opening 332 of the back valve and engages with and shifts the closing piece 331 away from the opening 332 to thereby open the flow passage from the feed duct 319 into the space between the spherical faces 327 and 328. When the roll mantle 12 and, thus, the glide bearing element 14 are in their extreme positions, it is possible in an extreme case that the spherical faces 327,328 are in contact with one another, but, in spite of this, pressure medium has access from the braking-pressure feed duct 319 into the bores 323 and from there further through the capillary bores 65 into the fluid or oil pockets 64. Thus, the fluid film is retained between the glide bearing element 14 and the inner face 12' of the roll mantle also in extreme situations even if the pressure present in the pressure duct 320 for the setting pressure were zero. The spherical faces 327,328 preferably correspond to one another and the bores 323 are formed so that, even if the spherical faces 327,328 were in contact with one another, the bores 323 are not closed, but through them there is a constant connection into the oil pockets 64. When the roll mantle 12 has returned to its "normal position", which is illustrated in FIGS. 3 and 3A, the back valve, which forms the regulation device 326, has been closed again via the biasing force of spring 333, whereby the pressure in the feed duct 319 cannot pass beyond the closing piece 331 of the back valve. Since the distances of movement of the roll mantle 12 are very limited, i.e., from the middle position shown in FIG. 3, for example, of an order of from about 10 mm to about 25 mm in each direction, the opening of the back valve 326 must take place rapidly in order that the braking pressure could act upon the space between the frame piece 63 and the bottom piece 321 of the glide bearing element 14 early enough. For this reason, the regulation device 326 need not restrict or regulate the flow of the braking pressure in any other way, but a mere open/closed operation is sufficient for the regulation device 326. It is preferable to use a conventional back valve as the regulation device. A construction fully similar to that described above is also used in the other glide bearing element 14a.

With reference to FIG. 3, it is possible to apply a mode of control which is an alternative to the regulation device 326 as shown in FIG. 3A, i.e. to the open/closed operation of the back valve. According to FIG. 3A, the opening of the back valve 326 was arranged mechanically under positive control, but, according to the alternative mode of FIG. 3, the back valve 326 is controlled electrically from outside. In this embodiment, the electrical control is accomplished so that in the principal loading direction of the roll, i.e., in the direction of the nip plane A, at both sides of the roll mantle 12, limit detectors 340,340a are installed outside of the roll, which are, for example, inductive connectors. The limit detectors 340,340a are electrically connected with a control device 341, from which there is a further electrical connection to each regulation device 326,326a. The regulation devices, and specifically the back valves 326,326a, are then, of course, provided with electrical control members (not shown). The limit detectors 340,340a do not measure the movement of the roll mantle 12 constantly, but the limit detectors 340, 340a are so-called ON/OFF connectors which are activated when the movement of the roll mantle 12 reaches a certain preset limit position in the direction of its movement. When this takes place, the limit switch 340,340a gives an impulse to the control device 341, which again transmits an electrical control command directly to the regulation device 326,326a at the side from which the movement of the roll mantle 12 approaches its preset extreme position, so as to open the respective back valve 326,326a and pass the braking pressure into the respective glide bearing element 14,14a. Thus, by means of the electrical control, the same final result is obtained as with the mechanical positive control described earlier.

Figure 4:
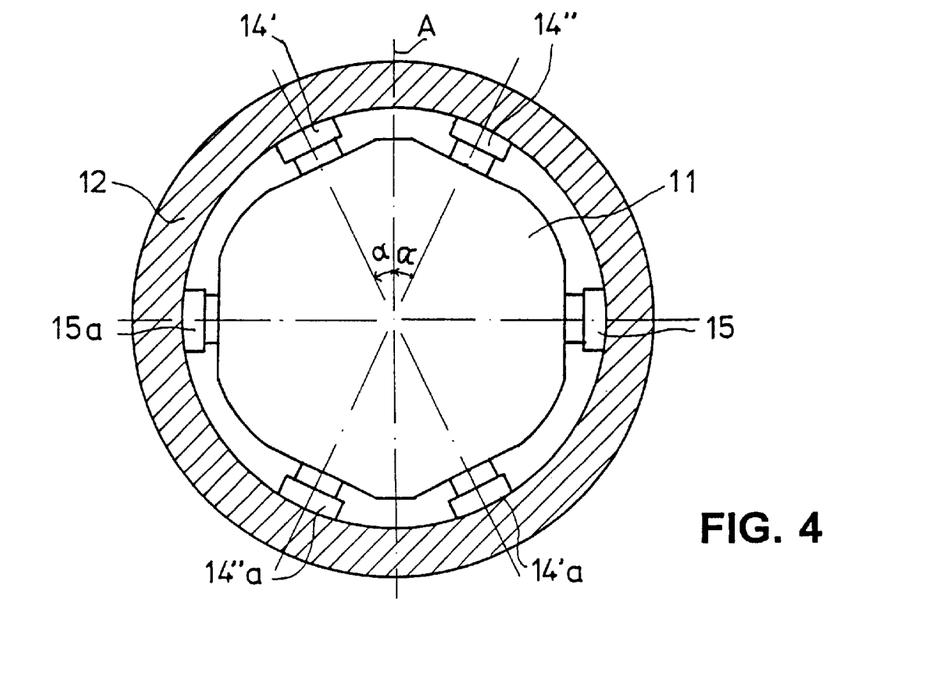
FIG. 4 shows an alternative embodiment of the embodiment shown in FIG. 2.

FIG. 4 illustrates an alternative embodiment to the embodiment shown in FIG. 2. As was already stated in connection with the description related to FIG. 2, the invention can also be carried out so that a number of glide bearing elements are used that are arranged to act radially in different angular positions. Thus, FIG. 4 illustrates a case in which the transverse support of the roll mantle 12 is arranged in a manner similar to that described in relation to FIG. 2, i.e. by means of glide bearing elements 15,15a acting in opposite directions. Instead, the support of the roll mantle 12 in the principal loading direction, i.e. in the direction of the nip plane A, has been accomplished so that, in the suggested embodiment, glide bearing elements 14',14",14'a,14"a are used which do not act directly in the principal loading direction, but diverge from this direction by the angle a in opposite directions. The embodiment shown in FIG. 4 is advantageous in particular in the respect that a force is achieved that is higher than in the construction as shown in FIG. 2 because the resultant of the forces of the glide bearing elements 14',14" and 14'a,14"a, respectively, acts in the principal loading direction. In all the other respects, the embodiment of FIG. 4 is similar to that described above whereby in each of the glide bearing elements acting in the principal loading direction, the regulation device described above is used.

Figure 5:
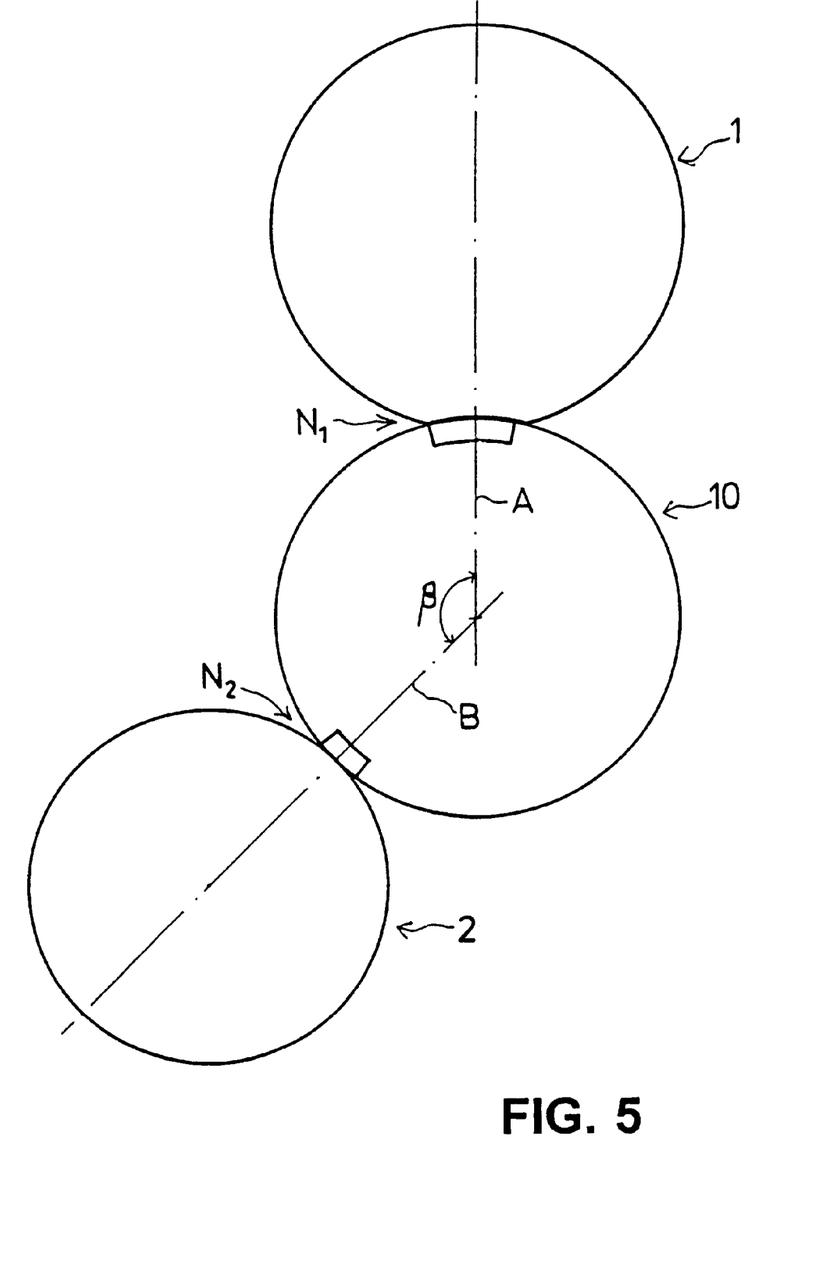
FIG. 5 is a view of a position to which the roll in accordance with the invention can be applied.

FIG. 5 is a further fully schematic illustration of a possible position in which a roll in accordance with the invention can be applied. In the embodiment illustrated in FIG. 5, the roll 10 is loaded in the directions of two planes, so that the roll 10 in accordance with the invention forms nips with two back-up rolls 1,2. Thus, in FIG. 5, the roll 10 has two nip planes A and B, which form an angle β with one another. Further, it is shown in FIG. 5 that the first back-up roll 1 is a so-called extended-nip roll which forms an extended nip $N_1$ with the roll 10 in accordance with the present invention. In FIG. 5, the other back-up roll 2 is an ordinary back-up roll which forms a nip $N_2$. Arrangements of other sorts are also possible in respect of the roll in accordance with the invention.

The examples provided above are not meant to be exclusive. Many other variations of the present invention would be obvious to those skilled in the art, and are contemplated to be within the scope of the appended claims.

We claim:

1. A method for arranging glide bearing elements in a tubular roll mantle of a roll for a paper machine, wherein the roll mantle is supported on a stationary roll axle by glide bearing elements acting upon the roll mantle under hydraulic pressure provided by a first pressure medium, and the roll is loaded radially in a principal loading plane, comprising the steps of:

arranging at least a pair of said glide bearing elements to support the roll in opposite radial directions in said principal loading plane and allow the roll mantle to move a preset radial distance in said principal direction to an extreme position, and braking the movement of the roll mantle as the roll mantle approaches said extreme position and stopping the movement of the roll mantle when the roll mantle is in said extreme position by controlling the flow of a second pressure medium into said pair of glide bearing elements.

2. The method of claim 1, further comprising the steps of providing a flow passage through which the second pressure medium flows from a braking-pressure regulation device to the glide bearing element, and opening the flow passage relative to movement of the roll mantle to allow the second pressure medium to flow into the glide bearing element when the movement of the roll mantle approaches its preset extreme position.

3. The method of claim 1, further comprising the step of opening a flow passage leading to the glide bearing elements for the second pressure medium to flow into the glide bearing element when the roll mantle approaches its preset extreme position.

4. The method of claim 1, further comprising the steps of directing a flow of the first pressure medium into the glide bearing elements, and stopping the flow of the first pressure medium into the glide bearing elements when the roll mantle reaches its preset extreme position.

5. The method of claim 1, wherein said principal loading plane is a plane in which the roll forms a nip with another roll, further comprising the step of arranging at least an additional pair of said glide bearing elements to support the roll in opposite radial directions in a plane transverse to said nip plane.

* * * * *